United States Patent [19]

Ashraff

[11] Patent Number: 4,702,267
[45] Date of Patent: Oct. 27, 1987

[54] PESTICIDE RINSER

[76] Inventor: M. Ahmed Ashraff, 739 Pepperloaf Crescent, Winnipeg, Manitoba, Canada, R3R 1G2

[21] Appl. No.: 734,203

[22] Filed: May 15, 1985

[30] Foreign Application Priority Data

May 17, 1984 [CA] Canada .................................. 454611

[51] Int. Cl.⁴ .............................................. B08B 3/02
[52] U.S. Cl. ................................ 134/166 R; 134/198; 239/271; 141/329
[58] Field of Search ................ 134/62, 166 R, 167 R, 134/169 R, 198; 239/271, 272; 141/239

[56] References Cited

U.S. PATENT DOCUMENTS

| 383,964 | 6/1888 | Mackintosh | 134/182 UX |
|---|---|---|---|
| 1,842,134 | 1/1932 | Waite | 141/329 X |
| 2,017,365 | 10/1935 | Klein | 141/329 X |
| 2,246,797 | 6/1941 | Geddes | 239/271 |
| 2,668,550 | 2/1954 | Burge | 134/62 |
| 2,813,753 | 11/1957 | Roberts | 239/271 |
| 2,857,005 | 10/1958 | Medlock | 239/271 X |
| 3,082,681 | 3/1963 | Petersen | 141/329 X |
| 3,095,001 | 6/1963 | Steltz | 134/167 R |
| 4,058,412 | 11/1977 | Knapp et al. | 134/62 X |
| 4,106,701 | 8/1978 | Siefken | 134/167 R X |
| 4,117,774 | 10/1978 | Wilburn | 239/271 X |
| 4,191,225 | 3/1980 | Ogle | 141/329 X |
| 4,296,785 | 10/1981 | Vitello et al. | 141/329 X |
| 4,485,877 | 12/1984 | McMillan et al. | 239/271 X |
| 4,534,449 | 8/1985 | Larson | 141/329 X |

FOREIGN PATENT DOCUMENTS 1947 of 1862 United Kingdom ............ 134/167 R

Primary Examiner—Philip R. Coe
Assistant Examiner—Frankie L. Stinson
Attorney, Agent, or Firm—McFadden, Fincham & Co

[57] ABSTRACT

This invention provides a fluid conducting device suitable for rinsing the interior of the bottom of pesticide containers. The device comprises a body having opposed ends with a fluid passage in the body, fluid inlet means in communication with a passage at one end of the body, container rupturing means at the other end of the body and extending therefrom and an abutment means separating the body from the container rupturing means. The fluid passage in the container rupturing means is in communication with the passage of the body, and the fluid discharge means in the container rupturing means is in communication with the fluid passage of the body. When the container is inverted and the container rupturing means is inserted into the bottom of the pesticide container to the stop provided by the abutment means, the fluid discharge means is disposed just slightly below the bottom of the container and is effective to discharge the fluid primarily against the interior of the bottom of the container.

5 Claims, 5 Drawing Figures

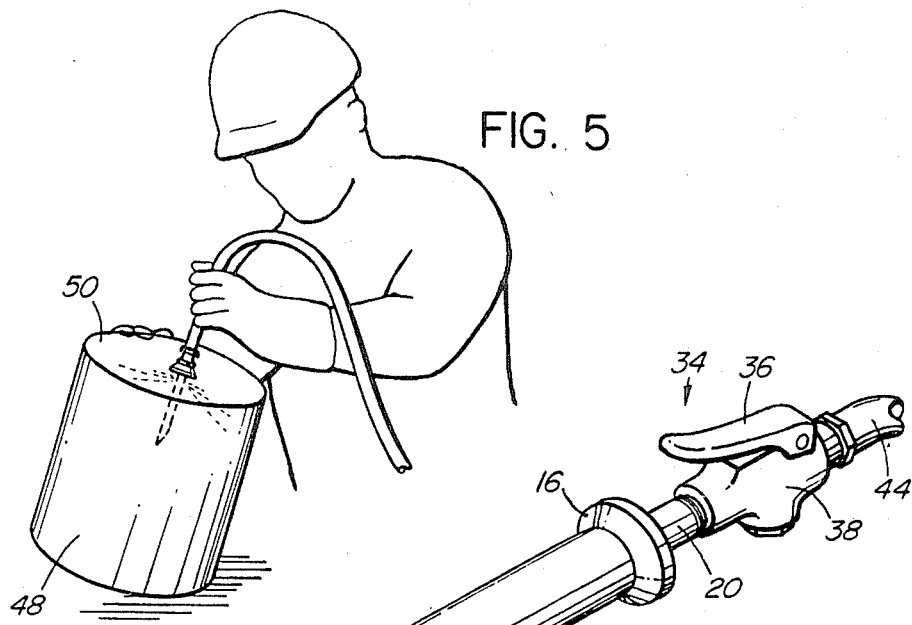
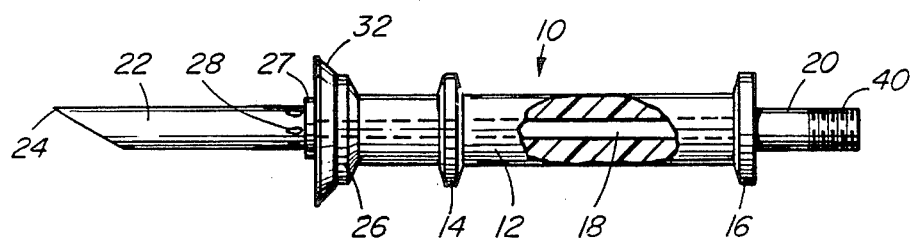
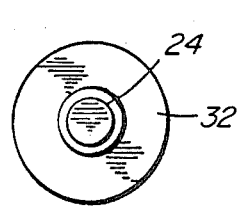
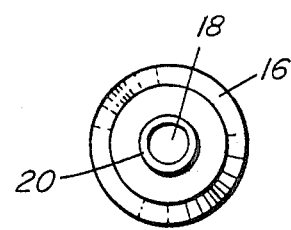
FIG. 5
FIG. 1
FIG. 2
FIG. 3
FIG. 4

PESTICIDE RINSER

This invention relates to a device suitable for fluid rinsing of containers.

More particularly, this invention relates to a hand-held device which can be used to rinse pesticide containers.

Pesticides are fairly widely used in various industries, ranging from herbicides to insecticides, etc. and these find wide-spread use particularly in agricultural or farming operations. Pesticides are normally sold to the user in containers ranging from one gallon or less to several gallons, which a user normally then dilutes for tank application. Disposing of containers which have retained pesticides can be somewhat critical, particularly if the pesticide container has been employed to retain highly toxic chemicals.

Currently, many of the containers used for pesticide purposes are merely disposed after their contents have been emptied, without taking any precautions to remove any residual pesticide in the container. Containers disposed in this manner could pose a hazard and for this and other reasons, it has been recommended in the industry to rinse the containers to remove any pesticide residue remaining. In addition, recovery of any pesticide remaining in the container by rinsing also has economic advantages in that more active chemicals can be recovered.

Conventionally, rinsing can be carried out by merely adding water to the container, shaking the container thoroughly and then draining the resulting material from the container. However, to be effective, such rinsing should be carried out a minimum of three time before the container is discarded.

In rinsing containers, as noted above, water is normally added to the containers by means of pouring the desired quantity of water into the container through a funnel, or alternately by placing a hose in the container opening and filling it. Inasmuch as most pesticide is located on the side-walls and bottom of the container (as opposed to the top-wall), rinsing is considered generally to be effective resulting in only minor amounts of pesticides remaining in the container after triple rinsing. On the other hand, to avoid any possible re-use of the containers, even after being rinsed, it has been recommended that the containers be punctured or otherwise rendered unsable, which is a further step which has to be undertaken by the user following rinsing.

It would be desirable if the objective of rinsing pesticides containers could be carried out by the use of an attachment which could be readily mounted on a hose or the like supply of a fluid for rinsing pesticide containers, and which would eliminate the need for triple rinsing of the container. Still further, it would be desirable to provide such a device with means for rendering such container useless; to this end, applicant has developed a device which can be hand-held for conducting fluid and which is suitable for rinsing the interior of the bottom of pesticide containers, with device containing a body having opposed ends with a fluid passage in such body, fluid inlet means in communication with said fluid passage at one end of said body, container rupturing means at the other end of said body and extending therefrom and an abutment means separating the body from the container rupturing means, a fluid passage in the container rupturing means in communication with said passage of said body, and fluid discharge means in said container rupturing means and in communication with the fluid passage of said body. When the container is inverted and the container rupturing means is inserted into a container the bottom of the pesticide container to the stop provided by the abutment means after rupturing a container, said fluid discharge means is disposed just slightly below the bottom of the container and is effective to discharge said fluid in primarily against the interior of the bottom of said container.

In greater detail of the present invention, the device has a main body which is adapted to be hand-held, and to which a fluid passageway or channel extends from one end to the other. One end of the device may be adapted for mounting or connection to a supply of fluid such as a hose or the like by suitable connecting means (e.g., couplings or the like); one embodiment of the present invention in a preferred form includes, at the inlet end for the fluid, valve means associated therewith said device for providing the desired control of the flow of liquid. Such valve means may be any conventional valve means for this purpose; preferably such valve means will provide for on-off flow capabilities with varying flow control between the "on" and "off" positions capable of handling the desired fluid flow pressure, for example, 35 to 40 psi. Such valve control means can be incorporated into the device of the present invention as as integral part thereof or alternately may be coupled between the device of the present invention and a source of fluid by mounting the valve between the device and the source of fluid by coupling means or the like.

The device of the present invention has, as one of its features, container rupturing means forming an intregal part thereof and which comprises a sharp puncture tip connected to the body and formed of suitable material to enable the same to rupture any container made of conventional material which typically include plastic or metal. The puncture means preferably comprises an extention of the body of the same or different material as the body, terminating in a pointed tip. One embodiment comprises a rod-like extension of the main body, having a tapered end portion, which may be made of metal or plastic.

As outlined above, the main body includes a fluid passage extending therethrough in communication, at one end of the body, with the inlet and at the other end, with an outlet or discharge orifice for the fluid. Preferably, the main body comprises a cylindrically shaped member which enables the device to be held by a hand, so that the main body may have a suitably shaped cylindrical central portion, recessed inwardly from the balance of the body.

Having generally described the invention, reference will now be made to the accompanying drawings illustrating preferred embodiments and in which;

FIG. 1 is a perspective view of a device of the present invention embodying valve means;

FIG. 2 is a side elevational view of a portion of the device of FIG. 1, showing a portion of the body in a cut-away view;

FIG. 3 is an end view of the device of FIG. 2 taken from the left-hand side;

FIG. 4 is an end view of the device of FIG. 2 taken from the right-hand side; and FIG. 5 is a perspective view showing the use of the device to rinse a pesticide container.

Referring in particular to FIGS. 1 and 2, a device of the present invention comprises a body indicated generally by reference numeral 10 which has a gripping portion formed as a recess in the body and indicated by reference numeral 12. A pair of spaced apart portions 14 and 16 are provided on the body, and which will be described hereinafter in greater detail.

Extending through the body 10 is a fluid passageway indicated by reference numeral 18 and which is in communication with a fluid inlet 20, which may be threaded for the purpose of receiving a valve member. The body 10 and the inlet means 20 can be integral if desired.

The container piercing means in the preferred embodiment shown comprises a metal rod 22 projecting from the end of the body 10 opposed to the inlet 20; the piercing means 22 has a point 24 formed by tapering the metal rod 22, and which is suitable for piercing the container wall to provide access to the interior for the rinsing operation. The piercing member 22 is also provided with a fluid passageway centrally thereof, which is in communication with the passage 18 of the body 10; in a preferred embodiment the passageway need only extend a short distance inwardly of the end 22 connected to the body 10. The container rupturing means 22 is provided with fluid discharge means in the form of a plurality of apertures 28 which are peripherally located about the circumference of the rod 22; and a particularly preferred embodiment, the apertures 28 form nozzles which direct spray outwardly/upwardly towards the wall and inverted bottom of the container.

A seal 32 is also provided which is journalled on rod 22 and surrounds the rod 22 peripherally as well as the member 26. The seal 32 may be journalled on a recess between the recess formed by shoulder 26 extending outwardly and radially of the body 12 and by further shoulder 27; the seal is provided with an aperture which will permit it to slide over shoulder 27 and fit in the recess. Seal 32 is preferably provided with a downwardly and outwardly tapering side-wall (FIG. 2); member 32 is adapted to face against the wall of the container and to prevent any spray exiting from the container.

In the embodiment illustrated in FIG. 1, the device is provided with a valve which may be conveniently manipulated by a user; the valve is indicated generally by reference numeral 34 and may be any suitable type. The particular version illustrated includes a lever 36 connected by means of an arm (not shown) to the valve body 38, the operation of which in turn, will open/close the valve 34 while regulating the flow of fluid passing through the valve. In this case, the valve 34 is illustrated as being threaded onto the inlet 20 by means of co-operating threads 40 on the inlet 20 and mating internal threads (not shown) on the valve 34. Conveniently, a hose or the like 44 may be connected to the valve by appropriate means. With the arrangement shown, one person only may use the device without having to reach for remote on-off controls.

In use, a pesticide container or the like, indicated by reference numeral 48 (FIG. 1), which are generally several gallons for industrial purposes, and which containers are normally made of plastic or sheet metal.

The typical container includes a cylindrical side-wall as illustrated, and a bottom wall 50. Normally, when using the device of the present invention, the bottom wall of the container will be ruptured so as to use the device of the present invention to spray the bottom interior wall of the container where the sediment or residues are normally located. To this end, the container puncturing means 22 are used to rupture the bottom wall of the container using the tip 24 for this purpose and the device inserted until the guard 32 is adjacent or abutting the bottom wall of the container as illustrated in FIG. 5. By arranging the spray nozzles of the container puncturing means 22 so as to spray upwardly, or at least a portion of them spraying upwardly, the device will spray the interior of the container to permit the residues to be removed from the container and to drain outwardly, through the top of the container where the spout is normally located, into a vessel or tank (not shown).

For ease of puncturing the container, the body 10 of the container is provided with the outwardly protecting portion 14 which is provided with a shoulder so that a force may be exerted on the device to push it through the container wall. In a like manner, the gripping device is provided with an abutment 16, which may be used to pull the device from the container.

It will be understood that various modifications can be made to the above described embodiments without departing from the spirit and scope of the invention as defined herein.

I claim:

1. A hand-held fluid conducting device suitable for rinsing the interior of the bottom of pesticide containers, said device comprising a main, manually-graspable body having opposed ends with a fluid passage in said body, fluid inlet means in communication with said passage at one end of said body, said body having container rupturing means at the other end of the said body and extending therefrom, said container rupturing means comprising an elongated nozzle closed by a tapered wall terminating at its bottom end in a knife edge and an abutment means separating said body from said container rupturing means, a fluid passage in said container rupturing means in communication with said passage of said body, and fluid discharge means in communication with said fluid passage of said body, said fluid discharge means consisting essentially of a plurality of spaced-apart fluid openings peripherally located about the circumference of said container rupturing means, said openings being directed exclusively upwardly and outwardly from said container rupturing means towards said body, said openings being sufficiently spaced longitudinally downstream from said abutment means whereby, when said container rupturing means is inserted into said container through said bottom when said container is inverted, said fluid discharge means is effective to discharge said fluid primarily against the interior of said bottom of said container.

2. The device of claim 1, further comprising manually-operable valve means for providing an on-off control of the fluid flow through said fluid passage.

3. The device of claim 2, wherein said valve means comprises controls means for controlling a fluid flow through said fluid passage of said body in incremental volumes of fluid flow between a full on and full off position.

4. The device of claim 3, wherein said body comprises a hollow body member having a gripping portion, and a pair of spaced apart abutment means on said gripping portion.

5. The device of claim 2, wherein said body includes a recess adapted to receive a splash seal.

* * * * *